May 26, 1970   W. H. KEARSLEY   3,513,817
THERMALLY MODULATING AIR SUPPLIES
Filed July 23, 1968   2 Sheets-Sheet 1

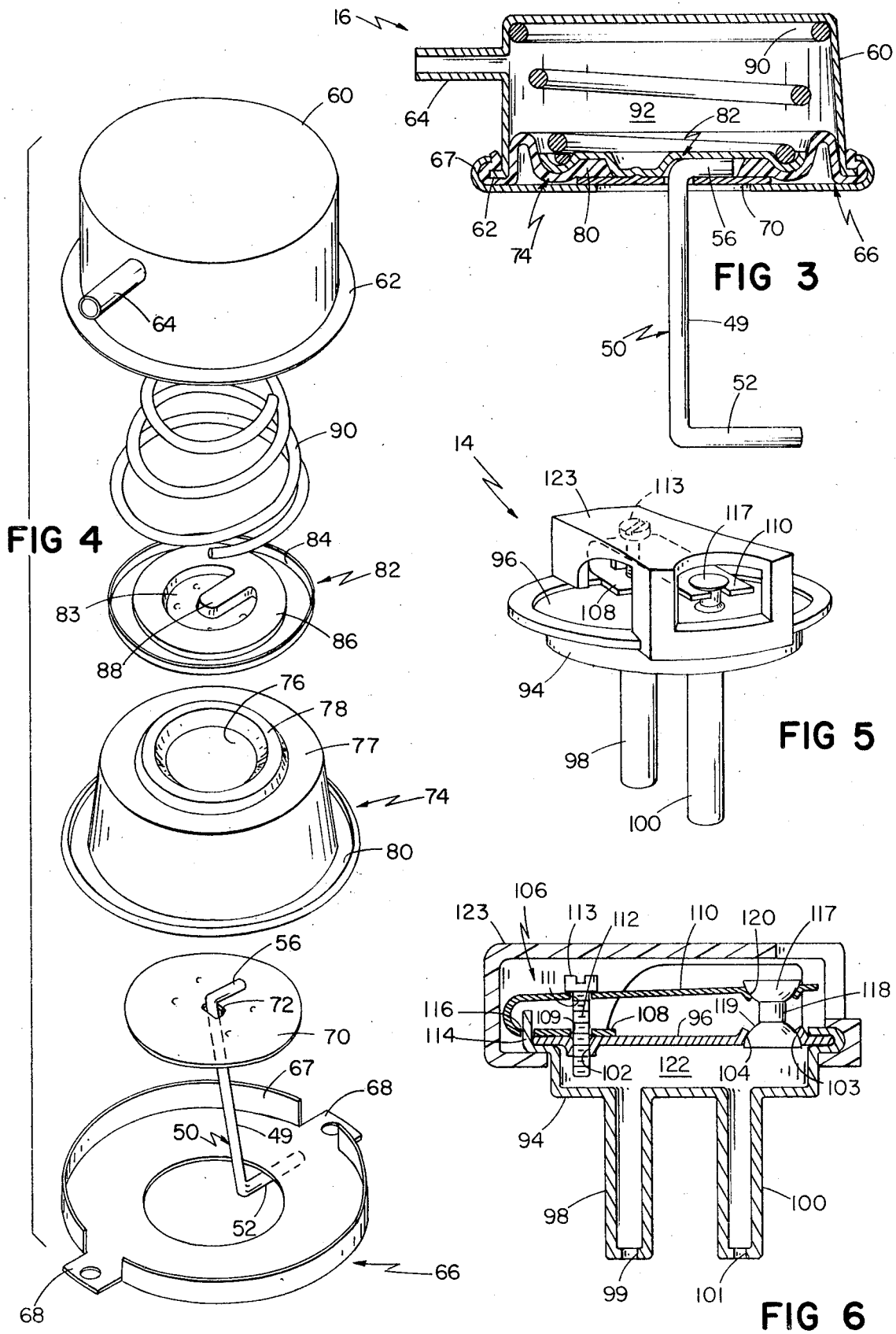

United States Patent Office 3,513,817
Patented May 26, 1970

3,513,817
THERMALLY MODULATING AIR SUPPLIES
Walter Hugh Kearsley, Chatham, Ontario, Canada, assignor to Fram Corporation, Providence, R.I., a corporation of Delaware
Filed July 23, 1968, Ser. No. 746,840
Int. Cl. B01d 39/10; F02m 31/02
U.S. Cl. 123—122                                                4 Claims

ABSTRACT OF THE DISCLOSURE

An automotive air cleaner having warm and cold air conduits, a damper door for proportioning cold and warm air delivered to the air cleaner, the damper door being responsive to temperature and vacuum, and controlled by a housing provided with a diaphragm including a central aperture, a shaft pivotably connected at one end to the damper door and at the other end sandwiched between a piston and washer at the diaphragm central aperture to provide a second pivotal connection.

---

The invention relates to thermal modulated air cleaner systems for automotive engines of the type having a pivoted damper door controlled by a vacuum chamber and a temperature sensor.

Objects of the invention are to provide an inexpensive, reliable, simply manufactured and assembled system having a minimum number of parts, including a vacuum chamber assembly with self-centering components, a durable flexible sealing member, and a short damper door hook; and a sensor of small size which does not require sensitive alignment of valve and valve seat.

The invention features a system in which the vacuum chamber has a flexible sealing member inside a housing, the sealing member having a central opening covered on one side by a washer and on the other side by a piston (joined to the washer through the opening), and a hook has one end pivoted to the door and the other end pivotally sandwiched between the washer and the piston. In preferred embodiments the sealing member is generally cup shaped in its relaxed state and in operation flexes in only one direction; the sandwiched hook end extends generally transversely to the main hook shaft and is received in a recess in the piston which limits the pivoting of that hook end to pivoting about an axis generally parallel to the damper door pivot axis; the washer has an elongated hole for the hook to permit its pivoting; the vacuum chamber housing has peripherally flanged upper and lower portions which are clinched to sandwich the periphery of the sealing member, allowing the central portion of the sealing member along with the washer and piston to move within the housing; the piston is recessed to receive a rib on the sealing member for centering; a portion of one of the housing peripheral flanges forms a mounting extension; the sensor has a housing with a pair of orifices to communicate vacuum to the vacuum chamber, a J-shaped bi-metallic strip having its short leg mounted on a wall of the housing having a valve opening therein and its long leg resiliently cantilevered over the valve opening, a valve member loosely suspended by its head in a hole in the long leg, and a screw threaded into aligned openings in the short leg and the wall; the headed end of the screw extends through a hole in the long leg to calibrate the strip; and a locating tab protrudes from the wall through an opening in the short leg.

Figure 1:
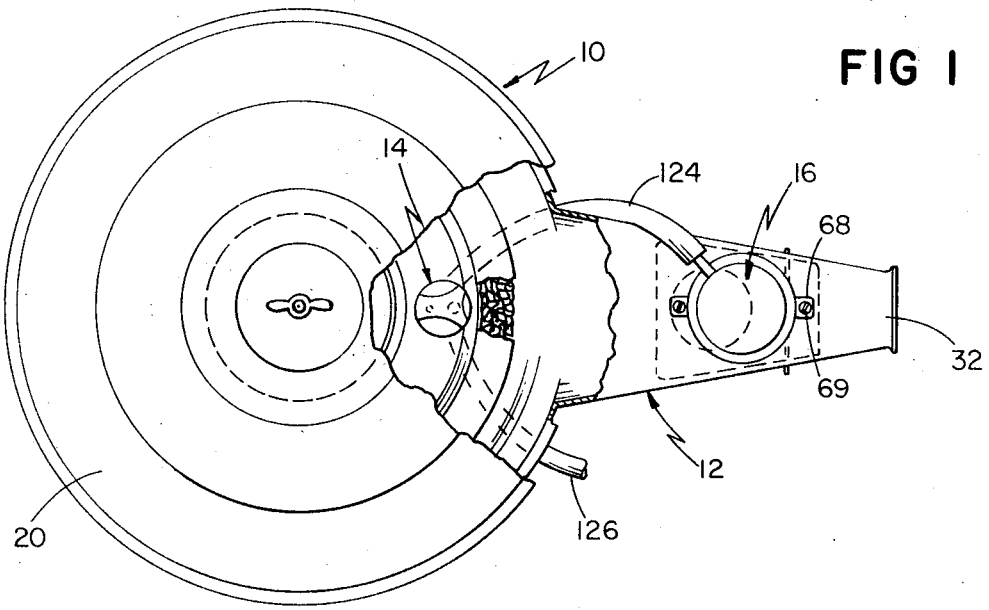
Figure 2:
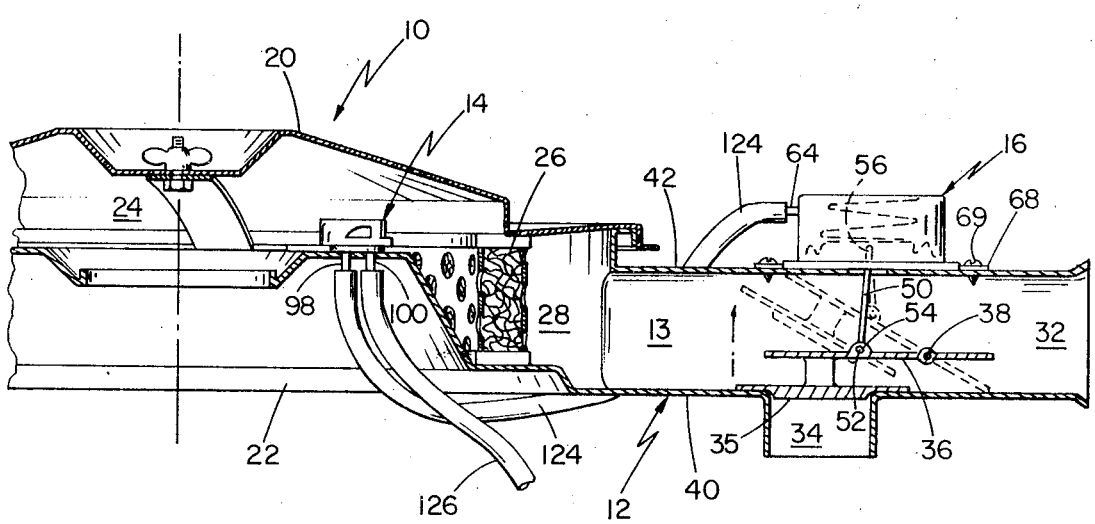

Other objects, features and advantages will appear from the following description of a preferred embodiment of the invention, taken together with the attached drawings thereof, in which:

FIG. 1 is a top view, partially cut away, showing an air cleaner and the system of the invention;
FIG. 2 is a side view, partially in section, of the air cleaner and system of FIG. 1;
FIG. 3 is a cross-sectional view of the vacuum chamber assembly shown as a portion of FIGS. 1 and 2;
FIG. 4 is an exploded view of the vacuum chamber assembly;
FIG. 5 is a perspective view of the sensor shown as a portion of FIGS. 1 and 2; and
FIG. 6 is a cross-sectional view of the sensor shown in FIG. 5.

Air cleaner 10 is supplied by air mixer 12 through conduit 13. Sensor 14 is mounted within the air cleaner and vacuum chamber assembly 16 is mounted on air mixer 12.

Air cleaner 10 includes upper and lower walls 20 and 22 defining an inner filtered air chamber 24 and surrounded by a cylindrical filter 26; an annular unfiltered air chamber 28 surrounds filter 26.

Inlet assembly 12 includes a cold air input conduit 32 communicating into the atmosphere and a warm air input conduit 34, the proportion of air from each input conduit appearing in conduit 13 being determined by adjacent parallel damper doors 35, 36 fixed relative to each other pivotable about a pin 38 fixed in the inlet assembly. The damper doors may move from a first position in which door 35 is flush against the bottom inlet assembly wall 40 closing off conduit 34 to a second position in which door 36 has one end pressed against inlet assembly upper wall 42 and the other against inlet assembly lower wall 40 to close off communication between conduit 32 and conduit 13 of the inlet assembly.

A hook 50 has a lower end leg 52 perpendicular to its main shaft 49 and parallel to pin 38 rotatably received by a mounting 54 on damper door 36. The hook extends at its other end through a hole in inlet assembly wall 42 into vacuum chamber assembly 16, terminating in an upper leg 56 parallel to the lower one.

Vacuum chamber assembly 16 includes an upper housing cap 60 (FIGS. 3, 4), with a bottom flange 62 and a small tube 64 clinched in the side wall of cap 60 through a hole provided therefor, and a lower housing cap 66 having an aperture through which the main shaft 49 of hook 50 extends, and an upwardly extending flange 67. Portions of flange 67 form tabs 68 transverse to the flange to mount the assembly on inlet assembly wall 42 with screws 69. Above the lower cap is a washer 70, larger than the lower cap aperture and having a hole 72 through which hook main shaft 49 extends. Hole 72 is elongated in the direction perpendicular to the upper leg 56 of the hook to allow rotational movement of the leg. A flexible sealing member 74, in its relaxed state (see FIG. 4) having the form of a slightly conical cup with a central opening 76 surrounded by a rib 78 extending upwardly from the otherwise flat top central portion 77 and a flange 80 extending outwardly at its peripery, is above washer 70. An annular piston 82, generally flat, has an upwardly extending flange 84 at its outer edge, an annular recessed portion 86 corresponding to flexible cup rib 78 for centering purposes during assembly and a raised portion 88 extending from the annular groove to the center of the piston to accommodate hook upper leg 56 extending through sealing member opening 76.

In final assembly washer 70 covers one side of the central portion of sealing member 74 and piston 82 the other side, sealing member opening 76 allows the central portion 83 of piston 82 to be spot welded to washer 70, sandwiching sealing member top 77 between the two to provide a seal and the piston raised portion 88 in combination with washer 70 sandwiches hook upper leg 56 so that the leg is rotatable about its axis. A coil spring 90 is located between upper cap 60 and piston 82, seated in the piston recess formed by the wall of recessed portion 86 and flange 84. In final assembly upper housing cap flange 62 bears on sealing member peripheral flange 80, both flanges fitting inside lower housing cap flange 67 which is clinched over them to sandwich the sealing member peripheral flange and provide a fully sealed vacuum chamber 92 in the vacuum chamber assembly 16. Flange tabs 68 mount the vacuum chamber assembly on inlet assembly wall 42 via screws 69.

Sensor 14 includes a bottom cup-like body 94 clinched to valve cover 96. Two tubes 98 and 100 having small orifices 99 and 101 are clinched into body 94 through holes provided therefore in air-tight seals. Valve cover 96 contains a hole 102 and a valve seat opening 104. A J-shaped bi-metallic strip 106 having a short leg 108 and a long leg 110 is mounted on the sensor, the short leg 108 lying on the top of valve cover and having an aperture 109 aligned with hole 102 so that the long leg is resiliently cantilevered over the valve seat opening. A hole 111 in the long leg lines up with holes 102 and 109 below and is slightly elongated in the direction of the long leg. A calibrating and securing screw 112 treated with locking sealant passes through hole 111 into threaded engagement with holes 102 and 109. The head 113 of screw 112 is larger than hole 111 to prevent its passing through the hole. Body 94 includes an upwardly protruding locating tab 114 passing through a slot 116 in short leg 108 to prevent rotation of the bi-metal strip about the screw.

A valve member 118 is loosely suspended by valve head 117 from a slot opening 120 formed in the end of the bi-metal strip long leg 110. Valve member 118 extends through valve seat opening 104 and forms, within cavity 122 formed by body 94 and valve cover 96, a valve surface 119 which faces valve seat opening 104. Depending on the temperature of the bi-metallic strip, it may act as a leaf spring to hold valve surface 119 against the formed seat 103 of valve seat opening 104, or be so deflected toward the opening that valve surface 119 drops off the seat. When the valve is seated by convex valve surface 119 mating valve seat opening 104, a sealed sensor cavity 122 is formed. A plastic cover 123 is mounted on the sensor to protect against damage of tampering.

Flexible hose 124 connects orifice 99 of sensor tube 98 to tube 64 of the vacuum chamber assembly 16. Orifice 101 of sensor tube 100 is connected via a second flexible hose 126 to the engine intake manifold, a source of vacuum.

In operation long leg 110 of bi-metallic strip 106 responds to the temperature in filtered air chamber 24 of the air cleaner; the bi-metallic strip is chosen to deflect downward with increasing temperature. The response of the strip may be adjusted by rotation of calibrating and securing screw 112.

At a low temperature of air in the filtered air chamber 24, bi-metallic strip leg 110 acts like a cantilever to keep convex valve surface 119 mated to the formed seat 103 of valve seat hole 104 in an air-tight seal. The convex surface of the valve allows some misalignment of the valve with respect to hole 104 without affecting the seal. The intake manifold provides a vacuum through hose 126 and orifice 101 for cavity 122 of the sensor. The vacuum is communicated to vacuum chamber 92 within the vacuum chamber assembly via orifice 99 of tube 98, hose 124, and tube 64. The vacuum existing in vacuum chamber 92 creates a lift on piston 82 against the downward force exerted by spring 90 to hold up hook 50 and damper doors 35, 36. The maximum upward position of the hook and doors is shown by the dotted lines in FIG. 2. In this position door 35 is not closing off conduit 34, and warm air passing through conduit 34 passes through conduit 13 to the air filter to raise the temperature of air in the filter. Door 36 extends diagonally from wall 42 to wall 40 of the inlet assembly to cut off conduit 13 from the flow of cold air in conduit 32.

At a high temperature bi-metallic strip leg 110 deflects downward so that valve surface 119 drops off formed seat 103 of valve seat hole 104 to diminish the vacuum in sensor cavity 122 and vacuum chamber assembly cavity 92. Orifice 101 in tube 100 of the sensor is small to prevent high air flow from sensor cavity 122 to the intake manifold when the valve is in its open position. The downward force of spring 90 is greater than the force of the vacuum in vacuum chamber 92 so that hook 50 and damper doors 35, 36 move downward. At the maximum downward position of the hook and doors shown by the solid lines of FIG. 2, door 35 closes off warm air conduit 34 and cold air flowing into conduit 32 is allowed to flow, uninterrupted by door 36, through conduit 13 into the air cleaner. Intermediate positions of the damper doors are possible at points at which the vacuum force and spring force are in equilibrium. Angular movement of hook 50 during movement of damper doors 35, 36 is translated into rotational movement of hook leg 52 in mounting 54 and of hook leg 56 within recessed portion 88 of piston 82. Washer hole 72 is slotted in the direction perpendicular to leg 56 to permit free movement of the adjacent hook leg 56.

Sealing member 74 always flexes in one direction only from the relaxed state, thereby diminishing the strain on the sealing member and increasing its life.

Other embodiments will occur to those skilled in the art and are within the following claims.

What is claimed is:

1. In a thermal modulated automotive air cleaner system having an air cleaner, a main conduit communicating with an automotive engine and including the air cleaner, warm and cold air conduits communicating with and connected to the main conduit, a damper door pivotally mounted in one of the conduits for movement about a first axis to control the mixture of warm and cold air flowing through the main conduit, a vacuum chamber assembly connected to the intake manifold of the engine and to the door for controlling the position of the door and including temperature sensor means within the main conduit for controlling the degree of vacuum in the vacuum chamber assembly, that improvement comprising:
   a hook having
      a main shaft,
      a first end portion pivotally connected to said door, and
      a second end portion;, and
   said vacuum assembly having
      a housing,
      a flexible sealing member within said housing having a central portion with an opening therethrough and a peripheral portion connected to said housing,
      a washer covering said opening on one side of said sealing member,
      a piston covering said opening on the other side of said sealing member,
   said second end portion of said hook being sandwiched between said washer and said piston and mounted for pivotal movement therebetween about at least a second axis generally parallel to said first axis, and
   said piston and said washer being joined together through said opening in said flexible member.

2. The system of claim 1 wherein said sealing member is generally cup-shaped in its relaxed state and is mounted in said housing for flexing between a plurality of positions in each of which said sealing member is flexed in the same direction from said relaxed state.

3. The system of claim 1 wherein said second end portion extends generally transversely to said shaft, said piston and washer cooperate to define a recess for receiving said second end portion, and said washer has a hole through which said hook shaft extends.

4. The system of claim 1 wherein said piston has a recess and said sealing member has a rib surrounding said opening and mating with said recess to center said piston relative to said sealing member.

References Cited

UNITED STATES PATENTS

| | | | |
|---|---|---|---|
| 1,429,257 | 9/1922 | Schulz. | |
| 1,945,609 | 2/1934 | Hoffman | 261—129 |
| 2,781,032 | 2/1957 | Sebok. | |
| 2,853,065 | 9/1958 | Stearns. | |
| 2,868,459 | 1/1959 | Modes | 236—87 |
| 3,000,570 | 9/1961 | Trubert. | |
| 3,079,898 | 3/1963 | Jensen | 236—13 |
| 3,319,888 | 5/1967 | Creager | 236—87 |
| 3,373,934 | 3/1968 | Kolbe et al. | 236—13 |
| 3,394,687 | 7/1968 | Scott | 236—86 |
| 3,413,780 | 12/1968 | Amlott et al. | 55—276 |
| 2,142,665 | 1/1939 | Brett et al. | 236—13 |
| 2,954,019 | 9/1960 | Mick | 123—119 |
| 3,174,498 | 3/1965 | Joesting | 236—87 |
| 3,265,373 | 8/1966 | Walker et al. | 251—61 |
| 3,444,847 | 5/1969 | King | 55—419 |

HARRY B. THORNTON, Primary Exxaminer

B. NOZICK, Assistant Examiner

U.S. Cl. X.R.

55—419, 510; 137—609; 236—87; 251—61.5